US008989377B2

(12) United States Patent
Wang et al.

(10) Patent No.: US 8,989,377 B2
(45) Date of Patent: Mar. 24, 2015

(54) SECURE VIDEO TRANSCODING WITH APPLICATIONS TO ADAPTIVE STREAMING

(71) Applicant: Futurewei Technologies, Inc., Plano, TX (US)

(72) Inventors: Xin Wang, Rancho Palos Verdes, CA (US); Xingze He, Los Angeles, CA (US); Xinwen Zhang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 97 days.

(21) Appl. No.: 13/732,240

(22) Filed: Dec. 31, 2012

(65) Prior Publication Data

US 2014/0185801 A1 Jul. 3, 2014

(51) Int. Cl.
*H04L 29/06* (2006.01)
*H04L 9/06* (2006.01)
*H04L 9/08* (2006.01)
*H04N 7/167* (2011.01)

(52) U.S. Cl.
CPC ............ *H04L 9/0662* (2013.01); *H04L 9/0891* (2013.01); *H04N 7/167* (2013.01); *H04L 2209/60* (2013.01)
USPC ........................... 380/200; 380/210; 713/168

(58) Field of Classification Search
CPC ............. G06F 15/16; H04L 9/08; H04L 9/28; H04L 63/06; H04L 63/10
USPC ................................... 380/200, 210; 713/168
See application file for complete search history.

(56) References Cited

U.S. PATENT DOCUMENTS

2006/0282665 A1 12/2006 Zhu et al.
2012/0297192 A1* 11/2012 Coppola et al. ............... 713/168

OTHER PUBLICATIONS

Carrillo et al., "Compression Independent Reversible Encryption for Privac in Video Surveillance", pp. 1-15, EURASIP Journal on Information Security, vol. 2009, Article ID 429581.*
Apostolopoulos, J., "Secure Media Streaming & Secure Adaptation for Non-Scalable Video," Proceedings of the IEEE International Conference on Image Processing, ICIP '04, Oct. 24-27, 2004, Singapore, vol. 3, pp. 1763-1766.
Wee, S., et al., "Research and Design of a Mobile Streaming Media Content Delivery Network," Proceedings of the IEEE International Conference on Multimedia and Expo, ICME '03, Jul. 6-9, 2003, Baltimore, Maryland, vol. 1, pp. 5-8.
Elshakawy, M., et al., "Secure Scalable Video Transcoding Over Wireless Network," IEEE International Conference on Intelligent Computer Communication and Processing, 2007, pp. 287-292.

* cited by examiner

*Primary Examiner* — Hadi Armouche
*Assistant Examiner* — Hee Song
(74) *Attorney, Agent, or Firm* — Conley Rose, P.C.; Grant Rodolph; Brandt D. Howell

(57) ABSTRACT

An apparatus comprising a processor configured to perform at least one transcoding operation on a first encrypted video frame to generate a second encrypted video frame. Also, a method comprising performing at least one transcoding operation on a first encrypted video frame to generate a second encrypted video frame. Also, an apparatus comprising a processor configured to retrieve a first encrypted video frame, wherein the first encrypted video frame is generated by encrypting an original video frame using an encryption key, and perform a transcoding operation on the encrypted video frame without revealing content of the original video frame.

13 Claims, 10 Drawing Sheets

SECURE VIDEO TRANSCODING WITH APPLICATIONS TO ADAPTIVE STREAMING

STATEMENT REGARDING FEDERALLY SPONSORED RESEARCH OR DEVELOPMENT

Not applicable.

CROSS-REFERENCE TO RELATED APPLICATIONS

Not applicable.

REFERENCE TO A MICROFICHE APPENDIX

Not applicable.

BACKGROUND

A video content provider or distributor may deliver various video contents to subscribers or users using different coding schemes suited for different devices, such as televisions, notebook computers, and mobile handsets. The video content distributor may support a plurality of video encoder and/or decoders (codecs), video media players, video frame rates, spatial resolutions, content bit-rates, end-devices, or combinations thereof. A video content may be converted from a source or original representation to various other representations to suit the different user devices and different distribution networks.

With increasing numbers of network types, user device types, and content representations, a video content distributor may need to store different versions or representations of the same video content on a source server or a rented content delivery network (CDN) node to satisfy the needs of various user devices. The storage of multiple representations may increase a cost of content distribution (e.g., increased storage space in the source server or increased fee to rent the CDN node). To avoid storing multiple representations, a video transcoder may be introduced onto the source server or CDN nodes and configured to convert a video content from one representation to another, as requested by user devices. Thus, video transcoding may enable a seamless interaction between video content creation and consumption.

In content preparation and delivery, transcoding devices (i.e. transcoders) implemented in CDN nodes, gateways, multipoint control units or servers, may be third party hardware and/or software. For example, content distributor NETFLIX may rent a third party transcoder belonging to AMAZON or AKAMAI, in which case the transcoder may be un-trusted by NETFLIX or its subscribing users. In existing video content delivery schemes, a video content going through a transcoding process may be completely exposed to the un-trusted third party transcoder. Consequently, privacy of users subscribing the video content, and the confidentiality and copyright of the video content may not be sufficiently protected.

SUMMARY

In one embodiment, the disclosure includes an apparatus comprising a processor configured to perform at least one transcoding operation on a first encrypted video frame to generate a second encrypted video frame.

In another embodiment, the disclosure includes a method comprising performing at least one transcoding operation on a first encrypted video frame to generate a second encrypted video frame.

In yet another embodiment, the disclosure includes an apparatus comprising a processor configured to retrieve a first encrypted video frame, wherein the first encrypted video frame is generated by encrypting an original video frame using an encryption key, and perform a transcoding operation on the encrypted video frame without revealing content of the original video frame.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
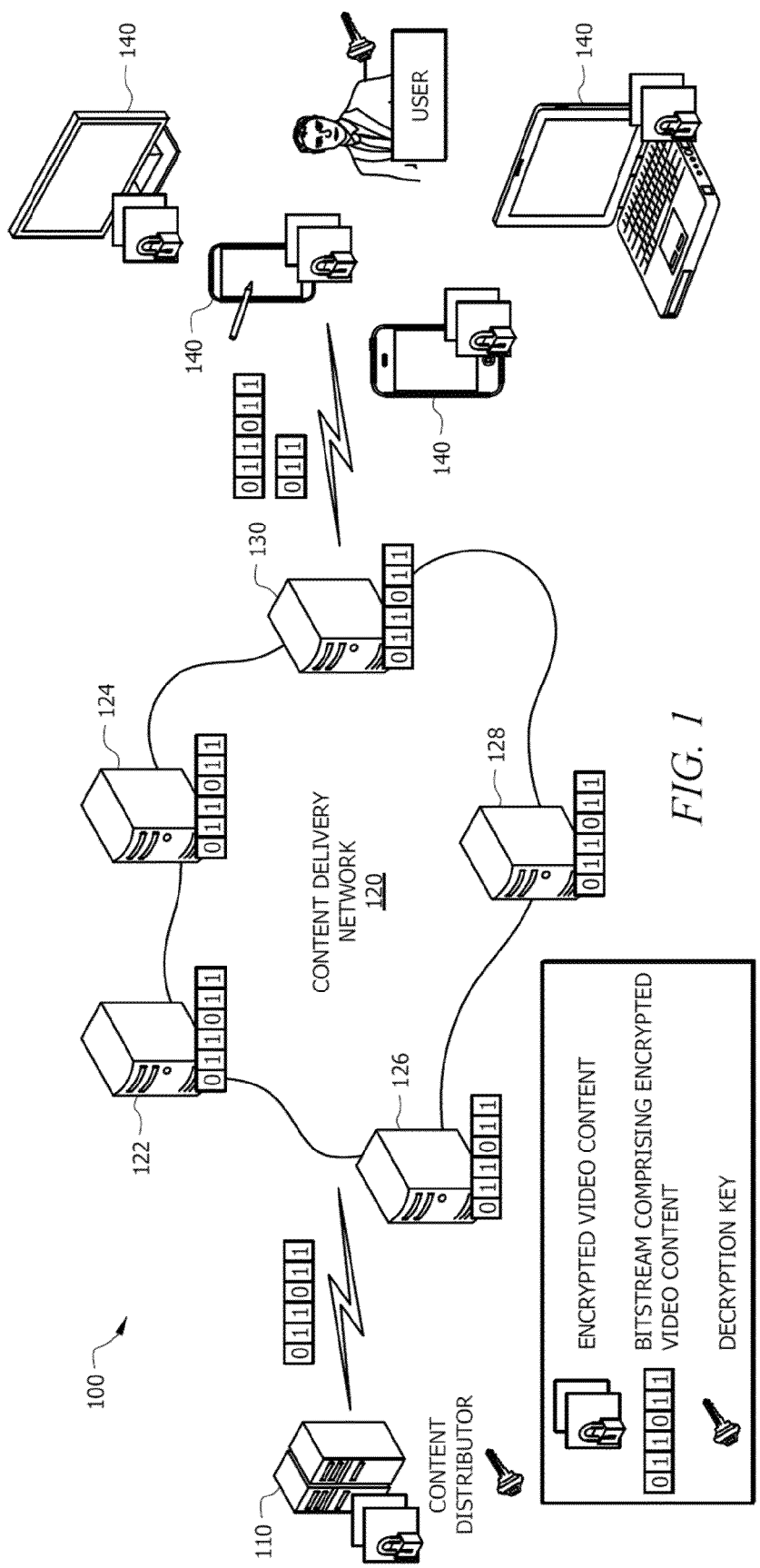
FIG. 1 illustrates an embodiment of a secure video content delivery scheme.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an existing video content delivery scheme, if a video content needs to be protected or securely delivered from a content distributor to a user device, the video content may first be encrypted by the content distributor using an encryption key and transmitted to an edge server, which may be a CDN node closer to the user device than other CDN nodes. In addition, the encryption key and its corresponding decryption key may also be provided to the edge server.

Upon receiving of the encrypted video content and the encryption/decryption keys, the edge server may decrypt the encrypted video content to retrieve the original video content. Then, the edge server may perform one or more transcoding operations on the original video content. Further, the edge server may encrypt the transcoded video content using the encryption key, before encoding it and sending out to the user device.

Although the existing video content delivery scheme may protect the video content from being accessed by other CDN nodes, it may still expose the original video content to the edge server comprising the transcoder. Since the edge server may still maliciously manipulate the original video content (e.g., inserting an undesired advertisement into the video content), further improvement are still needed to enhance the security of the original video content.

Disclosed herein are systems and methods for improved security in delivering video contents. A disclosed scheme may protect a video content from being exposed to an edge server while still allowing the video content to be transcoded by the edge server. If no transcoding is needed, the video content may still be protected from any authorized party. According to an embodiment, in a content distributor, a pseudorandom permutation key may be used as an encryption key to shuffle an order of transform blocks within each video frame of an original video sequence. An encrypted video sequence, for example, is transmitted to an edge server, while a decryption key needed to retrieve the original video sequence may be transmitted to a user device without going through the edge server. Thus, without knowing the decryption key, it may be computationally difficult for the edge server to retrieve the original video sequence. Meanwhile, transcoding operations, such as bit rate reduction under fixed resolution, frame rate reduction, and spatial resolution reduction, may still be supported by the edge server. Further, after receiving the encrypted video sequence from the edge server and the decryption key from the content distributor, the user device may reconstruct the original video sequence from the encrypted video sequence.

FIG. 1 illustrates an embodiment of a secure video content delivery scheme 100, which may involve multiple parties including a content distributor 110, a CDN network 120, and at least one user device 140. The content provider or distributor 110 may be any apparatus that provides various video contents. For example, the content distributor 110 may be a server operated by an online media streaming company (e.g., NETFLIX, YOUTUBE, AMAZON, and HULU). The content distributor 110 may store various video contents such as movies, television shows, and so forth.

Since a video content (e.g., a movie or television show) may comprise one more video sequences, and a video sequence comprises multiple video frames, the principles of the video content delivery scheme 100 may be illustrative using one of the video frames as an example. One skilled in the art will then recognize how to implement the video content delivery scheme 100 to multiple video frames included in a video sequence or video content A video frame comprises a plurality of picture samples or pixels, each of which may represent a single reference point in the frame. During digital processing, each pixel may be assigned an integer value (e.g., 0, 1, . . . , or 255) that represents an image quality or characteristic, such as luminance (luma or Y) or chrominance (chroma including U and V), at the corresponding reference point. To improve coding efficiency, the video frame is usually broken into a plurality of rectangular blocks or macroblocks, which may serve as basic units of processing such as prediction, transform, and quantization. For example, a typical N×N block may comprise $N^2$ pixels, where N is an integer and often a multiple of four.

When coding a current block in the video frame, a prediction block may first be generated using inter prediction based on a reference video frame, or using intra prediction based on one or more reference blocks in the same video frame. Then, a difference between the prediction block and the current block may be computed to generate a residual block comprising prediction residuals. Afterwards, the prediction residuals in a spatial domain may be converted to transform coefficients of a transform block in a frequency domain. The conversion may be realized through a transform (e.g. a discrete cosine transform (DCT)). Further, if desired, a quantization operation may follow the transform to reduce a number of high-indexed transform coefficients to zero values, which may be skipped in subsequent encoding steps. Depending on the coding scheme used by a content distributor, the transform block may or may not be quantized, thus hereafter the term transform block may broadly refer to either a quantized transform block or an unquantized transform block.

In use, the user device 140 may generate a request for a video content comprising an original video frame. The original video frame may herein broadly refer to any video frame that is not encrypted, or in other words, comprising clear-text content. To securely deliver the original video frame to the user device 140 via the CDN 120, the content distributor 110 may first generate an encryption key to encrypt the original video frame, thereby generating an encrypted video frame. Then, a video encoder located in the content distributor 110 may be configured to encode the encrypted video frame using any suitable entropy encoding technique. Examples of encoding techniques include, but are not limited to, context-adaptive binary arithmetic coding (CABAC) encoding, truncated Golomb-Rice encoding, exponential Golomb encoding, fixed length encoding, and any combination thereof. Using entropy encoding, transform coefficients as integers in each transform block may be converted to binary bits (e.g., each bit as "1" or "0"). Thus, the encrypted video frame may be converted to an encoded and encrypted video frame, which is represented by a sequence of binary bits. The binary bits may then be packed or included into a bitstream, which may be transmitted by the content distributor 110 to the CDN 120. For example, binary bits "011011" are used in FIG. 1 to symbolically represent a bitstream comprising the encoded and encrypted video frame.

The CDN 120 may comprise a plurality of CDN nodes, such as nodes 122, 124, 126, 128, and 130, that are remotely coupled to one another. Among the plurality of nodes, the node 130 may be closest to a user device 140, thus the node 130 may be referred to as an edge node or server. The edge server 130 may receive video contents either directly from the content distributor 110 or indirectly through other CDN nodes. The edge server 130 may comprise various components for encoding, decoding, re-encrypting, and/or transcoding video contents. For example, the edge server 130 may comprise a receiver configured to receive a bitstream comprising the encoded and encrypted video frame, a decoder configured to decode the encoded and encrypted video frame into an encrypted video frame, a transcoder or transcoding unit configured to transcode the encrypted video frame from one representation to another, an encoder configured to encode the transcoded video frame, and a transmitter configured to transmit the encoded video frame. In order to fit different needs/requirements of the user device 140, transcoding operations performed by the transcoder may convert the encrypted video frame from one original representation to different representations. For example, if the user device 140 is a television, the video frame may be transcoded to have a relatively higher spatial resolution. Otherwise, if the user device 140 is a smartphone, the video frame may be transcoded to have a relatively lower spatial resolution.

The CDN 120 may comprise any combination of routers and other processing equipment necessary to transmit video content between the content distributor 110 and the user device 140. For example, two or more of the CDN nodes 122-130 may communicate via the public Internet or a local Ethernet network. The content distributor 110 and/or the user device 140 may be connected to the CDN 120 via wired or wireless links.

In the video content delivery scheme 100, the content distributor 110 may deliver a decryption key to the user device 140 without going through the edge server 130. Thus, the decryption key is inaccessible to the edge server 130. In an embodiment, transmission of the decryption key is separate from transmission of the encoded and encrypted video frame and implemented using a secure communication channel. Note that the decryption key intended for user device 140 may sometimes still be accessible to other CDN nodes (e.g., nodes 122-128), but not to the edge server 130 which is coupled to the user device 140. In use, the user device 140 may use the decryption key to retrieve the original video content from the encrypted one. Thus, video content may be delivered securely from the content distributor 110 to the user device 140 without being exposed to the edge server 130. The user device 140 may sometimes be referred to as a client, a user, or a customer. The user device 140 may be any device capable of requesting, receiving, decoding, decrypting, and/or playing video content. For example, as shown in FIG. 1, the user device 140 may take form of a television, a smartphone, a media player, a notebook, and so forth.

Although the CDN 120 is shown in FIG. 1 as an example, it should be understood that embodiments of the disclosed secure video delivery schemes may be applied to other types of networks. For example, the edge server may be connected via a wireless network (e.g., a Wi-Fi or mobile network) to a plurality of user devices in a community, and encrypted video content may be delivered from a content distributor to each user device securely. The edge server may transcode the encrypted video content, but may not have access to the decryption key. For another example, the edge server may be a server coupled or connected to a home network, in which case transcoding may be performed for devices within the home network. One skilled in the art will understand how to implement principles of this disclosure to various types of video content delivery networks.

To enable transcoding operations on encrypted video content as well as to keep video encoding efficient, a video frame may be encrypted using a permutation cipher on the level of transform blocks. Positions of transform blocks may be shuffled according to an encryption key generated by the permutation cipher, but positions of transform coefficients within each transform block may not be altered. In the content distributor 110, a video sequence may be encrypted using a permutation key. For a video sequence, the content distributor 110 may be configured to generate at least one encryption key and at least one corresponding decryption key. In an embodiment, three permutation key pairs, denoted as (K_enc_y, K_dec_y), (K_enc_u, K_dec_u), (K_enc_v, K_dec_v), may be generated for the Y, U, and V components of the video content respectively. Alternatively, two or three color components may share an encryption key and a decryption key.

In an embodiment, the encryption key is a permutation of a set of objects or numbers arranged in a particular order. Mathematically, k numbers may have k! possible permutations, where k is an integer and k! is a factorial expression k!=k(k−1)(k−2) ... (1). For a video frame in a video sequence, a permutation key may have a key space, a size of which depends on a number of transform blocks in the video frame. Suppose that the frame has a size of W×H, where W denotes a width of the frame in pixels and H denotes a height of the frame in pixels (e.g., a 1024×768 frame has 1024 pixels in its horizontal direction and 768 pixels in its vertical direction).

Further, suppose that each transform block has N×N transform coefficients computed from N×N pixels, where N is an integer. Then, the number of transform blocks in the frame is k=(W×H)/(N×N), where k is an integer greater than one, and the key space may have a size equaling k!. Note that even if some transform blocks have different sizes, the key space may still equal k!, where k denotes the number of transform blocks in the video frame. Furthermore, each permutation key may be generated using a pseudorandom algorithm and may take the form of a random sequence with integer values from 1 to k.

For example, if W=H=32 and N=8, a video frame has 32×32 pixels, and each group of 8×8 pixels is coded as a block. Each 8×8 block is coded as or represented by a transform block comprising 8×8 transform coefficients. In this case, the number of transform blocks in the frame is k=(32×32)/(8×8)=16, and the key space has a size of 16!=2.092279e+13. In other words, when arranging 16 integers with values from 1 to 16, there are 16! possible orders. For example, using one of the 16! possibilities to encrypt the Y component, the encryption key and its corresponding decryption key may be configured as follows, wherein the decryption key is determined by the encryption key:

$$K\_enc\_y=[12,7,14,2,4,9,3,10,1,16,15,13,6,11,5,8] \quad (1)$$

$$K\_dec\_y=[9,4,7,5,15,13,2,16,6,8,14,1,12,3,11,10] \quad (2)$$

A video content (e.g., a movie or television show) may comprise multiple video frame sequences. In an embodiment, distinct keys may be generated for each video sequence. Alternatively, if desired, multiple video sequences may share an encryption and decryption key pair.

Figure 2:
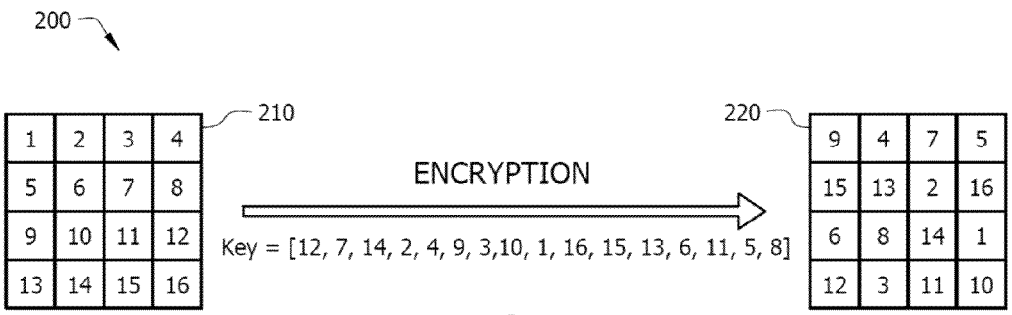
FIG. 2 illustrates an exemplary encryption scheme.

To correctly represent all three color components of a video frame, there may be three sets of transform blocks corresponding to the YUV components. In an embodiment, a content distributor may use three permutation keys, i.e., K_enc_y, K_enc_u, and K_enc_v, to shuffle the order of Y, U, V transform blocks respectively. FIG. 2 illustrates an exemplary encryption scheme 200, which may be implemented by a content distributor to convert an original video frame 210 to an encrypted video frame 220. The original frame 210 and the encrypted frame 220 may correspond to any of the Y, U, and V components. For illustrative purposes, suppose that the original frame 210 is encoded as 16 transform blocks, each of which may have any appropriate size. Each block is denoted with a number indicating an index or position of the block in the original frame 210. As shown in FIG. 2, block numbers may start from the top-left corner of the frame (index=1) and propagate row-by-row through each transform block, until reaching the bottom-right corner of the frame (index=16). Note that the transform block indexes used in FIG. 2 is merely an example, thus any other indexing schemes may be used within the scope of this disclosure.

Since the original frame 210 contains 16 transform blocks, there may be 16! different ways to arrange the transform blocks, each using a unique permutation key. In FIG. 2, the encrypted frame 220 is achieved using an encryption key K_enc=[12, 7, 14, 2, 4, 9, 3, 10, 1, 16, 15, 13, 6, 11, 5, 8]. Specifically, for j=1, 2, ..., 16, a j-th block in the original frame 210 may be moved to a K_enc[j]-th place of the encrypted frame 220, where j denotes the index of a transform block in the original frame 210, and where K_enc[j] denotes a j-th element of the encryption key. For example, for j=5, according to the encryption key in (1), K_enc[5]=4, thus the 5-th transform block in the original frame 210 is moved to the 4-th place in the encrypted frame 220, as shown in FIG. 2.

Figure 3:
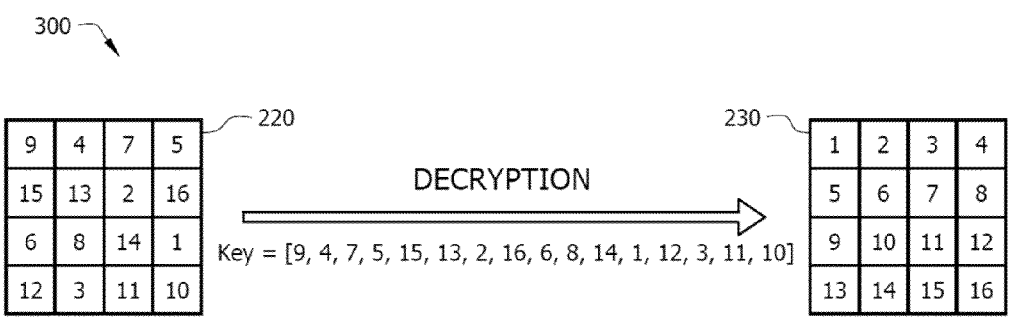
FIG. 3 illustrates an exemplary decryption scheme.

FIG. 3 illustrates an examplary decryption scheme 300 corresponding to the encryption scheme 200. The decryption scheme 300 may be implemented by a user device to convert the encrypted video frame 220 to a decrypted video frame 230, which may be the same with the original video frame 210 if the decryption key is correct. Since an encryption key determines a corresponding decryption key, the encryption key K_enc=[12, 7, 14, 2, 4, 9, 3, 10, 1, 16, 15, 13, 6, 11, 5, 8], for example, determines that the corresponding decryption key should be K_dec=[9, 4, 7, 5, 15, 13, 2, 16, 6, 8, 14, 1, 12, 3, 11, 10]. When rearranging transform blocks, the decryption scheme 300 may use the same or a similar algorithm with the encryption scheme 200. Specifically, a j-th block in the encrypted frame 220 may be moved to be a K_dec[j]-th block of the decrypted frame 230, where j denotes the index of a transform block in the encrypted frame 220, and where K_dec [j] denotes a j-th element of the decryption key. For example, for j=5, according to the decryption key, K_dec [5]=15, thus the 5-th transform block in the encrypted frame 220 (i.e., the block denoted as 15 in FIG. 3) is moved to be the 15-th block in the decrypted frame 230. Note that the decrypted frame 230 is the same as the original frame 210. Thus, through encryption and decryption, the content of a video frame may be recovered or retrieved.

For a general video frame represented by k transform blocks, a permutation key may be a set of k numbers with values from 1 to k, and each number may be considered an element of the permutation key. In an embodiment, to encrypt an original frame using an encryption key denoted as K_enc, a j-th transform block in the original frame is moved to be a K_enc[j]-th transform block in an encrypted frame, where j=1, . . . , k. Further, to decrypt the encrypted frame using a corresponding decryption key denoted as K_dec, a j-th transform block in the encrypted frame is moved to be a K_dec[j]-th transform block in an decrypted frame, where j=1, . . . , k.

Figure 4A:
FIGS. 4A and 4B are exemplary images of an original frame and an encrypted frame.
Figure 4B:
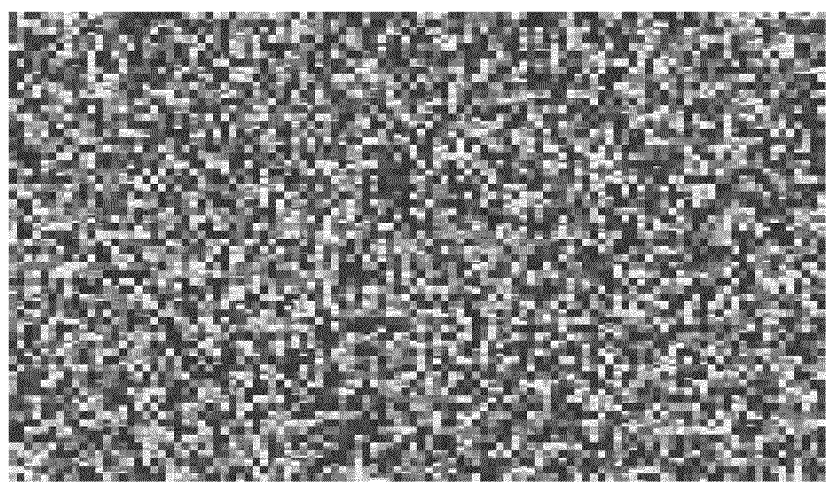

In use, if an encrypted frame is not decrypted or not correctly decrypted, the content of an original frame may not be recovered correctly. FIGS. 4A and 4B are examplary images of an original frame 410 and an encrypted frame 420 computed from the original frame 410. It can be seen that, without proper decryption, the encrypted frame 420 may not contain any useful information.

Figure 5:
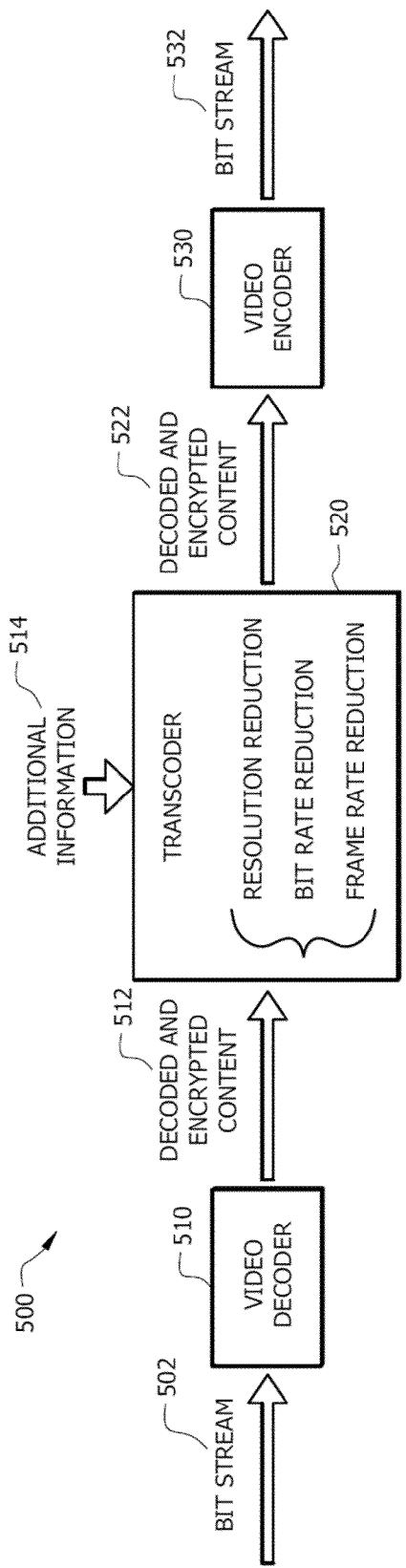
FIG. 5 illustrates an embodiment of a secure transcoding scheme.

As aforementioned, in a content distributor, a video sequence may be encrypted into an encrypted video sequence. Then, the encrypted video sequence may be entropy encoded as binary bits, which are then included in a bitstream. The bitstream may be transmitted from the content distributor to an edge server (either directly or through other CDN nodes), in which transcoding may be performed. FIG. 5 illustrates an embodiment of a secure transcoding scheme 500, which may be implemented any party in a video delivery system. For example, the scheme 500 may be implemented in a content distributor (e.g., the content distributor 110 in FIG. 1), a CDN (e.g., the CDN 120) node, an edge server, or a user device (e.g., the user device 140). A bitstream 502 comprising encoded and encrypted video content may be retrieved by an apparatus comprising a video decoder 510, a transcoder 520, and a video encoder 530. The video decoder 510 may be configured to decode the bitstream 502, during which the encoded and encrypted video content is converted to decoded and encrypted video content 512. The transcoder 520 may be configured to perform various transcoding operations on the decoded and encrypted video content 512. For example, the transcoder 520 may receive additional information 514 such as the type of user device, network condition, etc. Based on the additional information 514, the decoded and encrypted video content 512 in one representation may be converted to decoded and encrypted video content 522 in a different representation. Examplary transcoding operations may include, but are not limited to, resolution reduction, bit rate reduction, and frame rate reduction, which will be further described below. After transcoding operations, the decoded and encrypted video content 522 may be encoded by the video encoder 530 to become encoded and encrypted video content, which may then be included into a bitstream 532. The bitstream 532 may be sent from the edge server 500 to a user device.

Note that decoding, transcoding, and encoding operations may be performed on encrypted video content just as on clear-text video content. Thus, the video decoder 510, the transcoder 520, and the video encoder 530 may not need to be specially designed to accommodate encrypted video content. This simple implementation may be desirable in application. Further, it should be noted that the scheme 500 may include only a portion of all necessary components/modules. Accordingly, other components/modules, such as a receiver and a transmitter, may be added wherever appropriate. Moreover, note that, depending on where the scheme 500 is implemented, some of the modules may not be necessary. For example, if an encrypted video is retrieved from a local storage, no video decoder may be needed. Also, if the scheme 500 is implemented in a user device, no video encoder may be needed, as video will be played back without being transmitted to another device.

Figure 6:
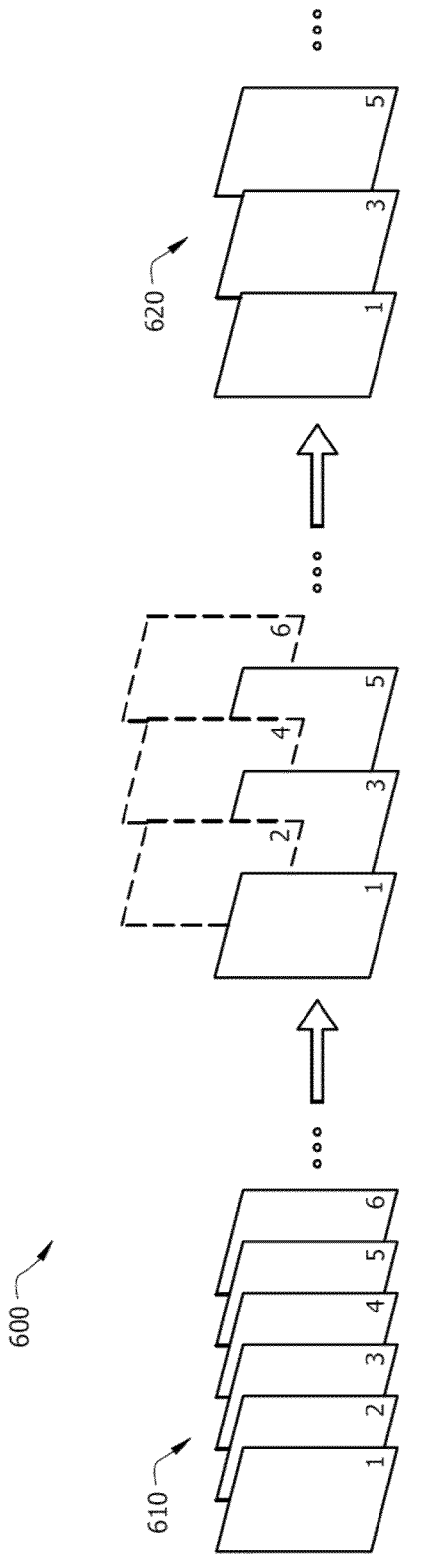
FIG. 6 illustrates an exemplary down-sampling scheme for frame rate reduction.

FIG. 6 illustrates an exemplary down-sampling scheme 600 for frame rate reduction. Suppose, for example, a decoded and encrypted video sequence 610 (e.g., in the video content 512) comprises a plurality of video frames including 6 sequential frames denoted as frame 1, frame 2, . . . , and frame 6. The down-sampling scheme 600 may reduce a frame rate of the video sequence 610 by removing a portion of the frames from the sequence. For example, every other frame may be removed. As shown in FIG. 6, the frames 2, 4, and 6 are removed and the frames 1, 3, and 5 are kept. As a result, in the same period of time, a down-sampled video sequence 620 may comprise less frames compared to the video sequence 610. In other words, the video sequence 620 has a lower frame rate than the video sequence 610.

Figure 7:
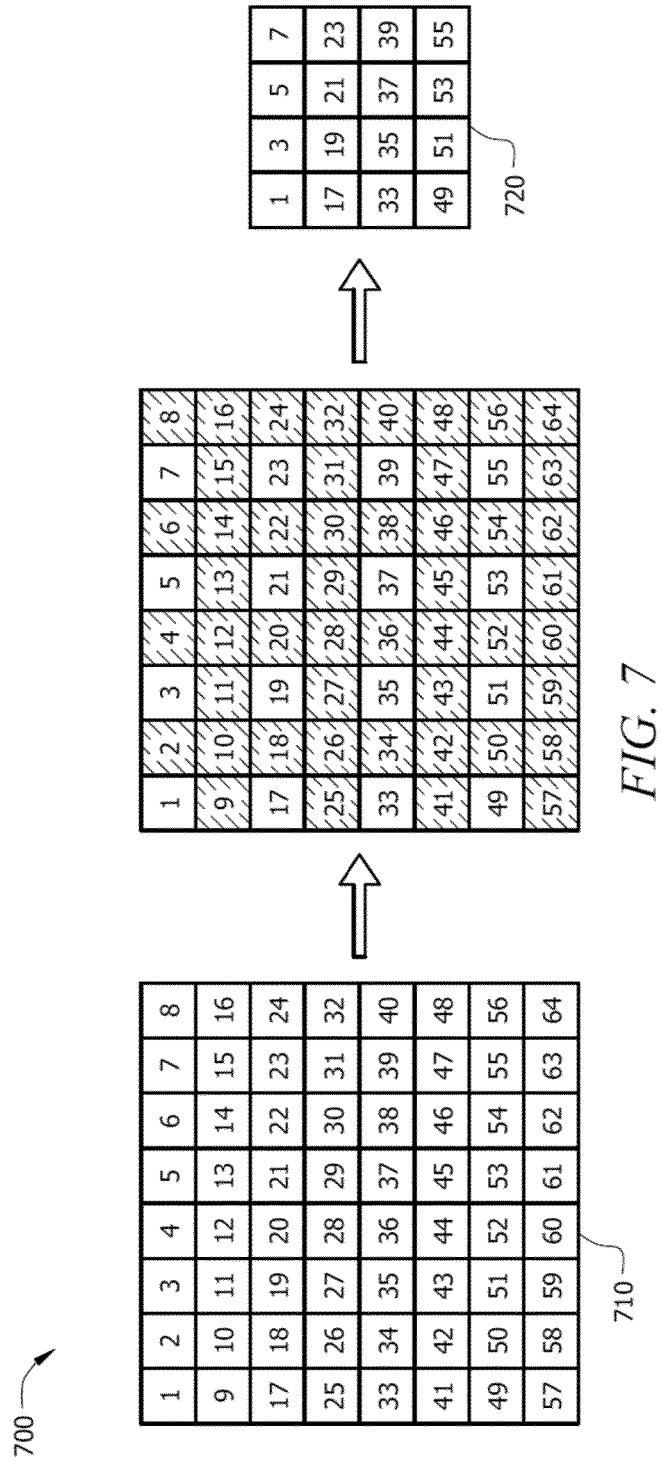
FIG. 7 illustrates an exemplary down-sampling scheme for spatial resolution reduction.

FIG. 7 illustrates an exemplary down-sampling scheme 700 for spatial resolution reduction. Suppose, for example, a decoded and encrypted video frame 710 (e.g., as part of the video content 512) comprises a plurality of pixels denoted as pixel 1, pixel 2, . . . , and pixel 64. Note that, depending on whether down-sampling is performed on the block level or pixel level, the pixels shown in FIG. 7 may represent blocks as well. The down-sampling scheme 700 may reduce a spatial resolution of the video frame 710 by removing a portion of the pixels. For example, every other pixel in the horizontal direction and in the vertical direction may be removed from the video frame 710. As shown in FIG. 7, every other pixel in odd rows (e.g., first, third, fifth, and seventh rows) and all pixels in even rows (e.g., second, fourth, sixth, and eighth rows) are removed. As a result, a down-sampled video frame 720 comprises only a quarter of the pixels in the video frame 710. In other words, the video frame 720 has a spatial resolution half of the video frame 710.

Further, without changing spatial resolution, a bit-rate needed to encode the video frame 710 may reduced or lowered by increasing a quantization parameter (QP), which is used when quantizing transform coefficients. Since encryption of a video frame is performed on a block level, e.g., by a permutation cipher, the original order of pixels in each transform block does not change. Therefore, format conversions between different block-based video coding techniques, such as Audio Video Interleave (AVI), Moving Picture Experts Group (MPEG), Windows Media Video (WMV), MOV format by APPLE, and flash video (FLV), may be supported. Note that two or more transcoding operations may be applied to a video frame. More advanced transcoding methods may also be utilized to improve coding efficiency.

Typically, a content distributor makes an encrypted video content accessible to a plurality of user devices. Although it may be okay for two or more user devices to share a decryption key when accessing the same video content, sometimes it may be more secure for different user devices to have different decryption keys. To prevent different user devices from sharing the same key to access the same encrypted content, this disclosure teaches a re-encryption scheme to be operated an already-encrypted content. When an encrypted video content is sent from a content distributor to an edge server, it may be re-encrypted (or further encrypted) by the edge server using an encryption key specific for each user device. Consequently, different user devices may receive different encryptions of the same video content.

Figure 8:
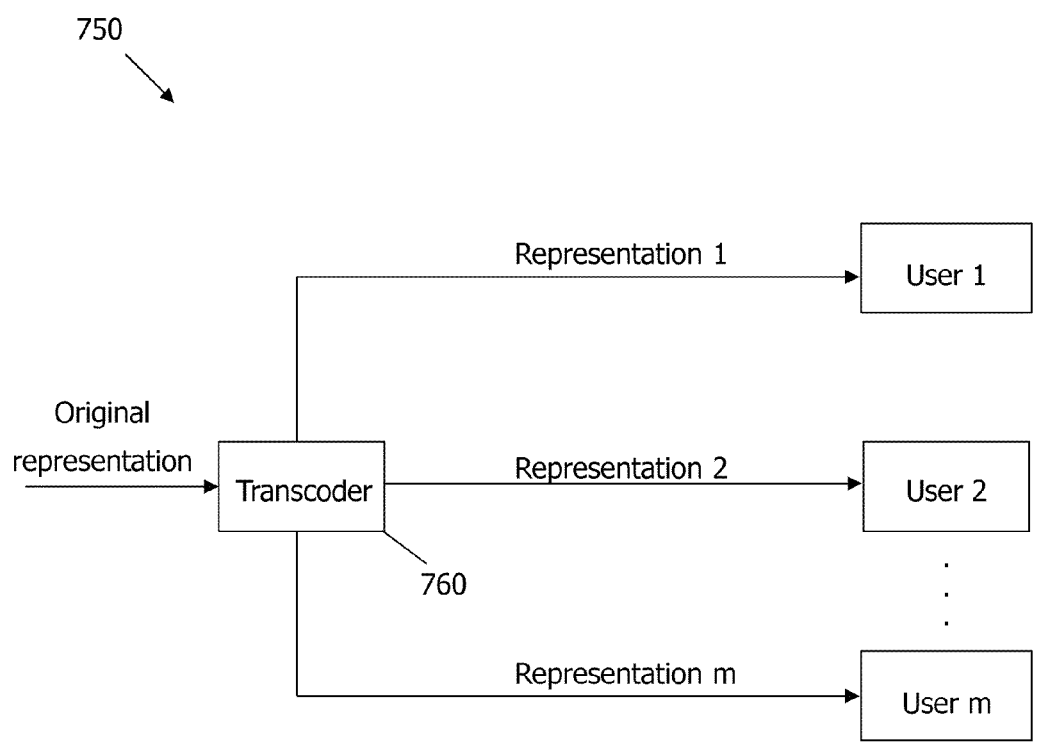
FIG. 8 illustrates an embodiment of another secure transcoding scheme.

FIG. 8 illustrates an embodiment of a transcoding scheme 750, which may be implemented by multiple parties as part of a video content delivery scheme, such as the video content delivery scheme 100. A transcoder 760 may be configured to retrieve a plurality of encrypted video frames in an original representation. The encrypted video frames may be retrieved locally (e.g., from a buffer or storage coupled to the transcoder 760) or remotely (e.g., received from another network node such as a content distributor). The transcoder 760 may be located within multiple parties in a video content delivery system. For example, the transcoder 760 may reside in a content distributor, an edge server, or a user device.

As shown in FIG. 8, based on information the transcoder 760 has regarding multiple users, each encrypted video frame in the original representation may be converted to different representations for different users. For example, the original representation may be transcoded to representation 1 for user 1, to representation 2 for user 2, . . . , and to representation m, for user m, wherein m is an integer denoting a number of users coupled to the transcoder 760. For appropriate transcoding, the transcoder 760 may use various information regarding the users, e.g., type of user device, network condition, user preference, or combinations thereof. Note that all transcoding operations are done on encrypted video frames, thus the transcoding process may not reveal the content of the original video frames.

Figure 9:
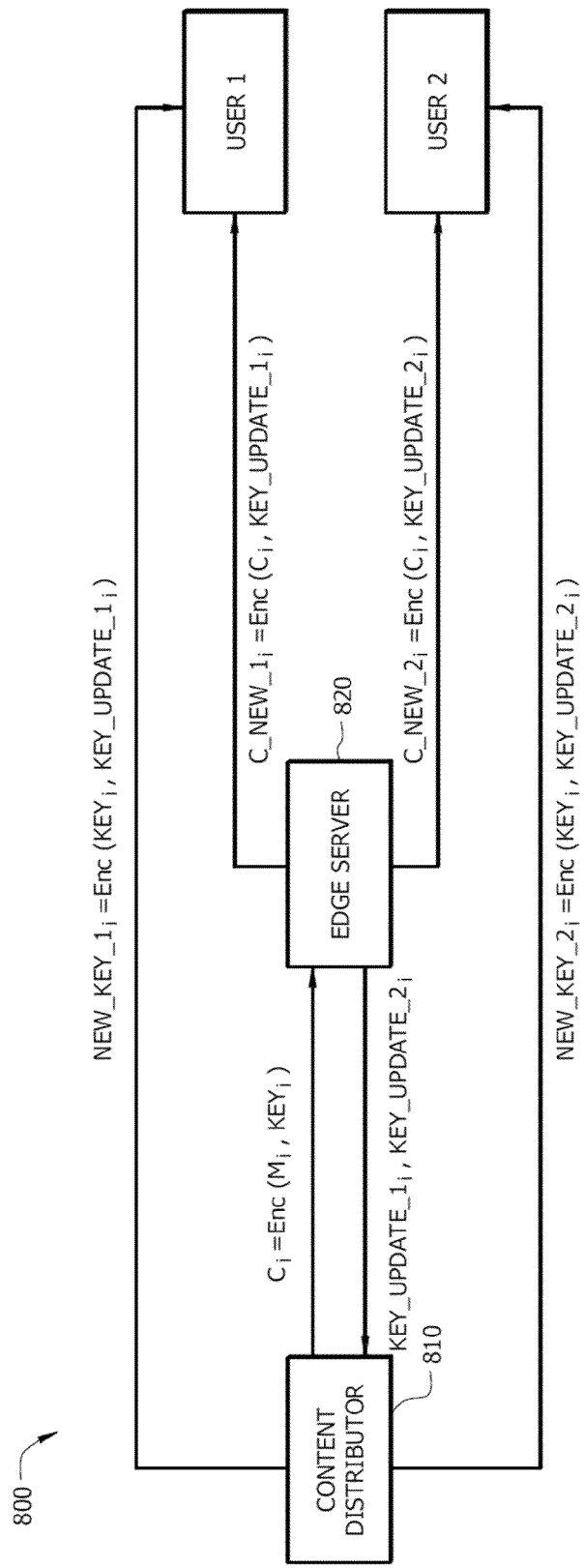
FIG. 9 illustrates an embodiment of a re-encryption scheme.

FIG. 9 illustrates an embodiment of a re-encryption scheme 800, which may be implemented by multiple parties as part of a video content delivery scheme, such as the video content delivery scheme 100. In a content distributor 810, an original video sequence, denoted as $M_i$, may be encrypted using an initial set of encryption keys, denoted as $KEY_i$= (K_enc_$y_i$, K_enc_$u_i$, K_enc_$v_i$), where i refers to a video frame sequence index. The encrypted video sequence may be expressed as:

$$C_i = Enc(M_i, KEY_i), \quad (3)$$

where Enc denotes an encryption operation performed on $M_i$ using $KEY_i$. Within $M_i$, transform blocks in each video frame are shuffled using the same $KEY_i$.

After $C_i$ is sent from the content distributor 810 to an edge server 820, it may be re-encrypted into different encryptions for different users. For example, for the request of $M_i$ from user 1, the edge server 820 may be configured to generate a set of update encryption keys, denoted as KEY_UPDATE_$1_i$= (K_enc_y_update$_i$, K_enc_u_update$_i$, K_enc_v_update$_i$).

Then, the edge server 820 may use KEY_UPDATE_$1_i$ to re-encrypt $C_i$ into a re-encrypted video sequence:

$$C\_NEW\_1_i = Enc(C_i, KEY\_UPDATE\_1_i), \quad (4)$$

where Enc denotes an encryption operation performed on C, using KEY_UPDATE_$1_i$. Then, C_NEW_$1_i$ may be sent from the edge server to the user 1.

Since user 1 may require a decryption key in order to recover $M_i$ from C_NEW_$1_i$, while the content distributor 810 may not wish the edge server 820 have the capability of retrieving $M_i$, the decryption key may be sent from the content distributor 810 to user 1 without going through the edge server 820. For the content distributor 810 to generate the decryption key, KEY_UPDATE_$1_i$ may be sent from the edge server 820 to the content distributor 810. Then, the content distributor 810 may generate a decryption key for user 1 as:

$$NEW\_KEY\_1_i = Hom(KEY_i, KEY\_UPDATE\_1_i), \quad (5)$$

where Hom denotes a homomorphic operation performed on the two keys: $KEY_i$ and KEY_UPDATE_$1_i$. Then, the content distributor 810 may transmit NEW_KEY_$1_i$ to user 1 via a secure communication channel.

After receiving the re-encrypted video sequence C_NEW_$1_i$ from the edge server 820 and the decryption key NEW_KEY_$1_i$ from the content distributor 810, user 1 may retrieve the original video sequence $M_i$ as follows:

$$M_i = Dec(C\_NEW\_1_i, NEW\_KEY\_1_i), \quad (6)$$

where Dec denotes a decryption operation performed on C_NEW_$1_i$ using NEW_KEY_$1_i$.

Similar to user 1, another use denoted as user 2 may also retrieve the original video sequence M. Briefly, the edge server 820 may re-encrypt C, using another encryption key, denoted as KEY_UPDATE_$2_i$ and different from KEY_UPDATE_$1_i$ to generate a re-encrypted video sequence C_NEW_$2_i$. Meanwhile, KEY_UPDATE_$2_i$ may be sent to the content distributor 810. Using a homomorphic operation, a decryption key denoted as NEW_KEY_$2_i$ may be computed from $KEY_i$ and KEY_UPDATE_$2_i$. After receiving C_NEW_$2_i$ from the edge server 820 and NEW_KEY_$2_i$ from the content distributor 810, user 2 may retrieve the original video sequence M.

Depending on how the edge server 820 determines identity of a user, the edge server 820 may generate the same encryption key or different encryption keys for multiple user devices belonging to the same user. For example, if the Internet Protocol (IP) address of a user is shared by a number of user devices and provided to the edge server 820, the number of user devices may be assigned a common encryption key. For another example, if a physical media access control (MAC), which is unique for each user device, is provided to the edge server 820, different user devices belonging to the same user may be assigned different encryption keys. As a result, different user devices may receive different decryption keys (generated and transmitted by the content distributor 810). Alternatively, if the content distributor 810, instead of the edge server 820, receives user-specific information, the content distributor 810 may generate different decryption keys for different users directly (i.e., without receiving encryption keys from the edge server 820).

As mentioned previously, the encryption and decryption keys may be permutation keys, and the size of the key space depends on a number of transform blocks in a video frame. Specifically, $k=(W \times H)/(N \times N)$ and the key space size equals k!, where W denotes a width of the frame in pixels and H denotes a height of the frame in pixels, and N denotes a width/height of each transform block in pixels. Table 1 shows examplary sizes of the key space for different video frame sizes.

TABLE 1

Sizes of the encryption/decryption key space for different video frame sizes.

| | Video frame size | | | | |
|---|---|---|---|---|---|
| | 352 × 288 | 416 × 240 | 832 × 480 | 1024 × 768 | 1920 × 1080 |
| Size of key space | 6336! | 6240! | 24960! | 49152! | 129600! |

Due to the large key spaces as shown in Table 1, the disclosed encryption/decryption schemes may provide strong security. With the cipher-text only secure property of the permutation cipher, computationally it may be difficult for a third-party transcoder to recover the original video content without the correct decryption key. Further, since the encryption key (and therefore decryption key) may be generated using a pseudorandom algorithm, there may be no fixed statistical characteristics. Consequently, attacking methods based on statistical analysis of the decryption key may be ineffective.

Although encrypted video frames may enhance security, the shuffling of transform blocks may reduce spatial redundancy (or correlation of transform coefficients) to some extent, which in turn may decrease encoding/decoding efficiencies. Simulations show that our encryption schemes increase bit-rate by a few percent. Thus, there is a trade-off between security and efficiency. On the other hand, the impact of encryption on coding efficiency may be alleviated or minimized by further optimization of encoding, decoding, and/or transcoding techniques.

Using different coding schemes, a video frame may be coded as a single layer or as multiple layers. For example, in single-layer based coding, the video frame may be coded as one layer in one spatial resolution (e.g., a 640×480 standard resolution or a 1920×1080 high resolution). Alternatively, in scalable video coding (SVC), the video frame may be coded as two or more layers, e.g., with a base layer representing a standard resolution and an extra layer representing a difference between the standard resolution and a high resolution. It should be understood that the disclosed encryption/decryption schemes may be implemented in either single-layer based coding or SVC. If more than one layer is used to code a video frame, each layer may be encrypted and decrypted independently. One skilled in the art will understand how to apply the disclosed schemes on each layer, thus the details will not be further described in the interest of conciseness.

Figure 10:
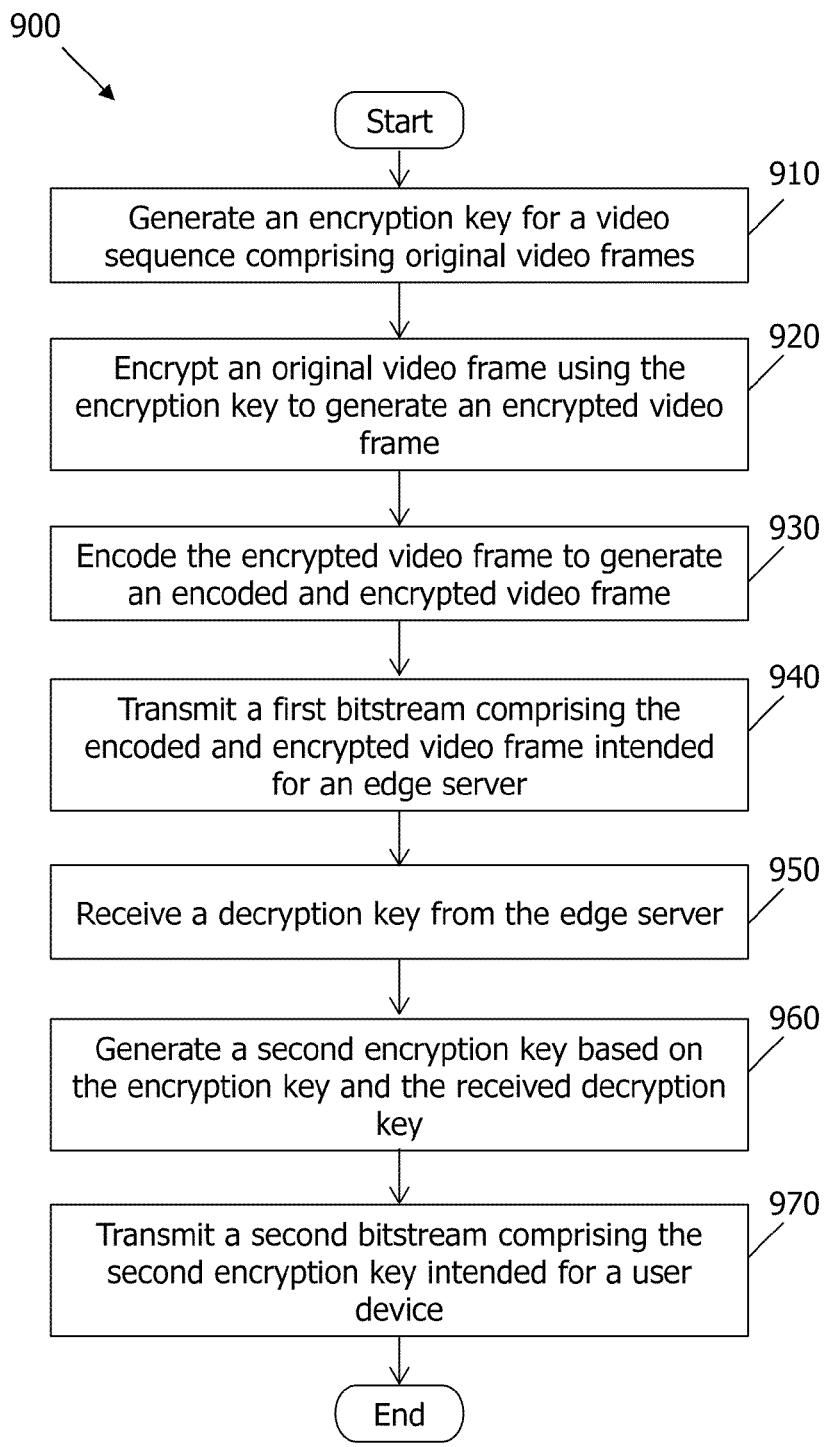
FIG. 10 illustrates an embodiment of a secure video delivery method.

FIG. 10 illustrates an embodiment of a secure video delivery method 900 implemented by a content distributor (e.g., the content distributor 110). The method 900 may be applied to some or all original video frames in a video sequence and to any of the Y, U, and V components. The method 900 starts in step 910, where an encryption key may be generated based on an original video frame in the video sequence. In an embodiment, the encryption key is a permutation of k numbers, where k is an integer greater than one. Each of the k numbers indicates a position of one of k transform blocks representing the original video frame. Further, the permutation of k numbers may be selectable from k! possibilities using a pseudorandom algorithm.

Next, in step 920, the original video frame may be encrypted using the encrypted key, thereby generating an encrypted video frame. The positions of transform blocks in the original frame are shuffled. In an embodiment, encrypting the original video frame comprises moving a j-th transform block in the original video frame to be a K_enc[j]-th transform block in the encrypted video frame for j=1, . . . , k, wherein K_enc[j] denotes a j-th number according to an order of the permutation of k numbers.

In step 930, the encrypted video frame may be entropy encoded to generate an encoded and encrypted video frame. Note that the encoded and encrypted video frame may be represented by binary bits as a result of entropy encoding. In step 940, the encoded and encrypted video frame may be transmitted as part of a first bitstream. Other information such as frame rate, spatial resolution, bit depth, may also be included into the first bitstream. The first bitstream may be intended for an edge server, which comprises a transcoder configured to perform transcoding operations on the encrypted video frame. Ultimately, after routing through the transcoder, the encrypted video frame may reach a user device, where it will be decrypted and played.

In step 950, a decryption key may be received by the content distributor. The decryption key may be sent by an edge server and designed to be unique for each user or each user device. In step 960, a second encryption key may be generated based on the encryption key generated in step 910 and the decryption key received in step 950. In an embodiment, the second encryption key is a homomorphic conversion of the two input keys, as shown in (5). In step 970, the decryption key may be transmitted as part of a second bitstream. The decryption key is separately transmitted from the content distributor to the user device without going through the transcoder. After obtaining both the encrypted video and the decryption key, the user device may retrieve the original video frame.

It should be noted that the method 900 may be modified within the scope of this disclosure. For example, if the encryption key and corresponding decryption key are the same for all user devices, step 950 may be removed. In step 960, the decryption key may be generated solely based on the encryption key. Consequently, if desired, the step 960 may be executed before step 920. Moreover, the method 900 may include only a portion of necessary steps in delivering an original video frame. Thus, additional steps, such as generation of transform blocks, quantization of transform coefficients, scanning of transform coefficients, etc., may be added into the method 900 wherever appropriate.

Figure 11:
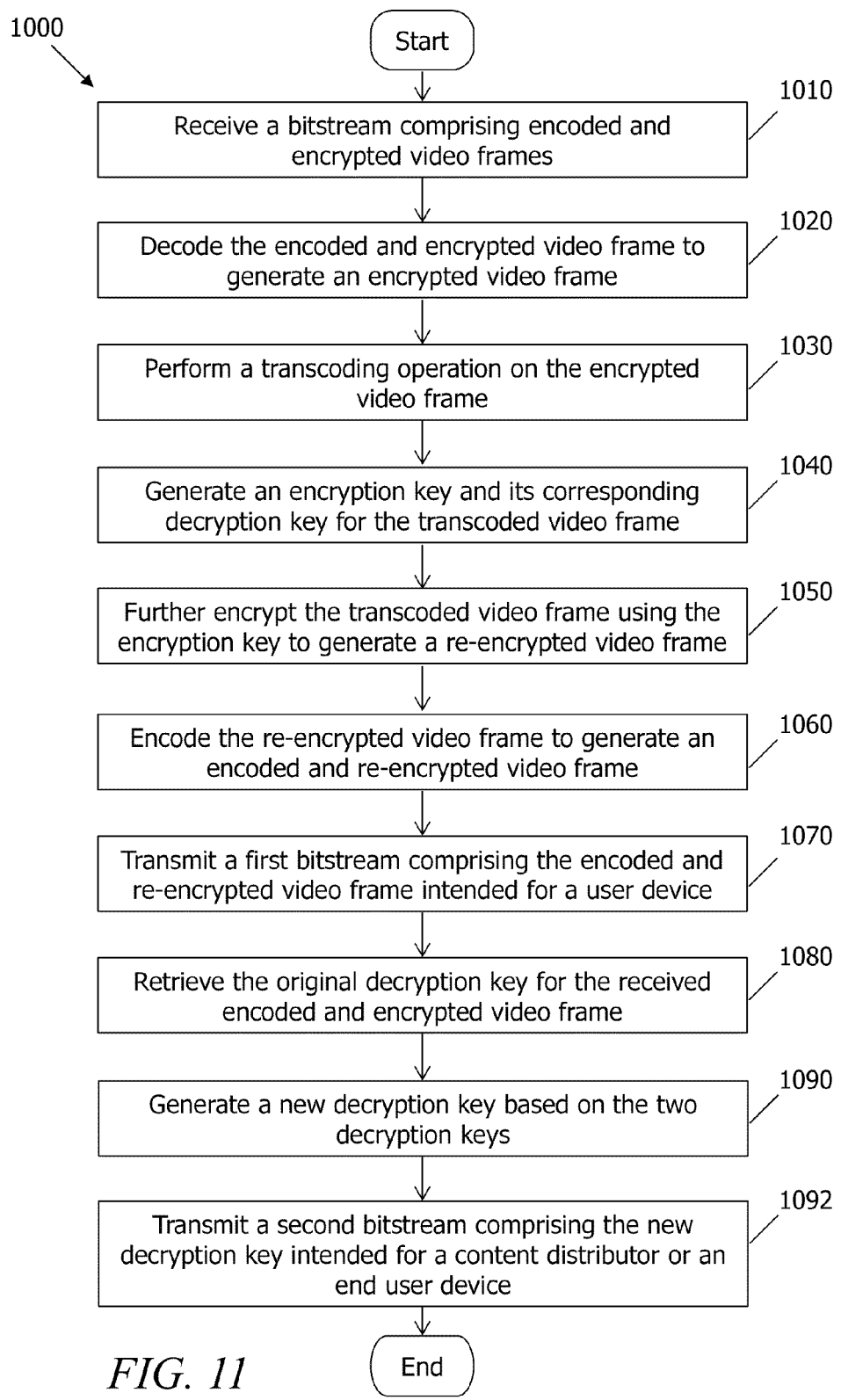
FIG. 11 illustrates a transcoding and re-encryption method.

FIG. 11 illustrates a transcoding and re-encryption method 1000 implemented by an edge server (e.g., the edge server 130). The method 1000 may be applied to some or all encrypted video frames in a video sequence, which may be received by the edge server. The method 1000 may be repeated for the Y, U, and V components. The method 1000 starts in step 1010, where a bitstream comprising an encoded and encrypted video frame may be received by the edge server. The encoded and encrypted video frame is in the form of binary bits.

In step 1020, the encoded and encrypted video frame may be decoded to generate an encrypted video frame. Next, in step 1030, one or more transcoding operations may be performed by a transcoder on the encrypted video frame to convert it from one representation to another. Transcoding operations may depend on additional information obtained by the transcoder, such as the type of user device requesting the video frame, network traffic, etc. Although the edge server is not aware of the clear-text content, its transcoding capabilities may be preserved.

In step 1040, an encryption key and its corresponding decryption key may be generated based on the transcoded video frame as well as identify information of the user device. The encryption and decryption keys may be unique for each user or each user device. In an embodiment, the encryption key is a permutation of k numbers, where k is an integer greater than one. Each of the k numbers indicates a position of one of k transform blocks representing the transcoded video frame. Further, the permutation of k numbers may be selectable from k! possibilities using a pseudorandom algorithm.

In step 1050, the transcoded video frame may be re-encrypted (or further encrypted) using the encryption key, thereby generating a re-encrypted video frame. The positions of transform blocks in the transcoded frame are shuffled. In an embodiment, encrypting the transcoded video frame comprises moving a j-th transform block in the transcoded video frame to be a K_enc[j]-th transform block in the re-encrypted video frame for j=1, . . . , k, wherein K_enc[j] denotes a j-th number according to an order of the permutation of k numbers.

In step 1060, the re-encrypted video frame may be entropy encoded to generate an encoded and re-encrypted video frame. Note that the encoded and re-encrypted video frame may be represented by binary bits as a result of entropy encoding. In step 1070, the encoded and re-encrypted video frame may be transmitted as part of a first bitstream, which is intended for a user device. In step 1080, the method 1000 may retrieve an original decryption key used to generate the encoded and encrypted frame, which was received in step 1010. In step 1090, a new decryption key may be generated based on the decryption key generated in step 1040 and the original decryption key retrieved in step 1080. In an embodiment, the new decryption key is a homomorphic conversion of the two input keys, as shown in (5). In step 1092, the new decryption key may be transmitted as part of a second bitstream, which is intended for a content distributor or an end user device for use of decrypting the re-encrypted video frame.

It should be noted that the method 1000 may be modified within the scope of this disclosure. For example, transcoding may also be performed after re-encryption, in which case step 1030 may be moved after steps 1040 and 1050. Re-encryption may then be done to the encrypted video frame instead of the transcoded video frame, and transcoding done to the re-encrypted video frame. For another example, if all user devices requesting the video frame share a common decryption key, steps 1040, 1050, and 1080 may be removed. Further, the execution of certain steps may be exchanged in order, provided that one step does not depend on another. Step 1080, for instance, may be moved ahead of step 1050 if desired. Moreover, the method 1000 may include only a portion of necessary steps in transcoding and re-encrypting an encrypted video frame. Thus, additional steps, such as receiving and processing of user identifying information, may be added into the method 1000 wherever appropriate. In addition, re-encryption may be done in a content distributor instead of an edge server.

Figure 12:
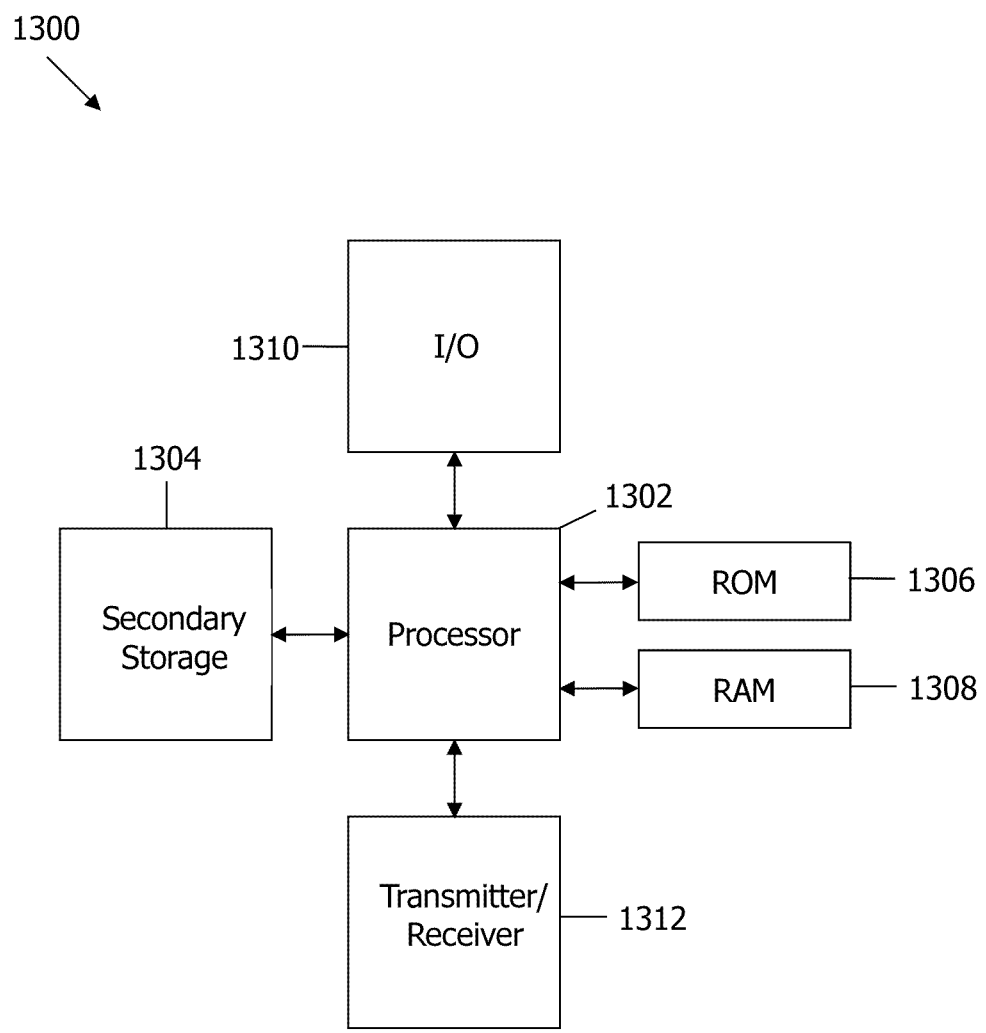
FIG. 12 illustrates an embodiment of a network node.

The schemes described above may be implemented on a network component, such as a computer or network component with sufficient processing power, memory resources, and network throughput capability to handle the necessary workload placed upon it. FIG. 12 illustrates an embodiment of a network component or node 1300 suitable for implementing one or more embodiments of the methods disclosed herein, such as the video content delivery scheme 100, the secure transcoding scheme 500, the secure transcoding scheme 750, the re-encryption scheme 800, the video delivery method 900, and the transcoding and re-encryption method 1000. Further, the network node 1300 may be configured to implement any of the apparatuses described herein, such as the content distributor 210, the edge server 230, or the user device 240.

The network node 1300 includes a processor 1302 that is in communication with memory devices including secondary storage 1304, read only memory (ROM) 1306, random access memory (RAM) 1308, input/output (I/O) devices 1310, and transmitter/receiver 1312. Although illustrated as a single processor, the processor 1302 is not so limited and may comprise multiple processors. The processor 1302 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the video content delivery scheme 100, the secure transcoding scheme 500, the secure transcoding scheme 750, the re-encryption scheme 800, the video delivery method 900, and the transcoding and re-encryption method 1000. The processor 1302 may be implemented using hardware or a combination of hardware and software.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304.

The transmitter/receiver 1312 may serve as an output and/or input device of the network node 1300. For example, if the transmitter/receiver 1312 is acting as a transmitter, it may transmit data out of the network node 1300. If the transmitter/receiver 1312 is acting as a receiver, it may receive data into the network node 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The transmitter/receiver 1312 may enable the processor 1302 to communicate with an Internet or one or more intranets. I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the network node 1300, at least one of the processor 1302, the secondary storage 1304, the RAM 1308, and the ROM 1306 are changed, transforming the network node 1300 in part into a particular machine or apparatus (e.g., a video codec having the novel functionality taught by the present disclosure). The executable instructions may be stored on the secondary storage 1304, the ROM 1306, and/or the RAM 1308 and loaded into the processor 1302 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
at least one receiver configured to:
   receive a bitstream from a content distributor for storage in a content delivery network (CDN), the bitstream comprising encrypted video frames;
   receive requests from a plurality of user devices for a plurality of representations of the bitstream; and
a hardware processor coupled to the receiver and configured to:
   perform at least one transcoding operation on the bitstream to generate at least one transcoded representation of the bitstream based on the requests from the user devices;
   generate at least one re-encryption key for the requests from the user devices;
   re-encrypt the at least one transcoded representation with the at least one re-encryption key generated for the requests from the user devices to create at least one re-encrypted representation; and
at least one transmitter coupled to the processor and configured to:
   transmit the at least one re-encrypted representation to at least one of the user devices responsive to the requests; and
   transmit the at least one re-encryption key to the content distributor to support generation and distribution of at least one updated decryption key to the at least one of the user devices for decryption of the at least one re-encrypted representation without receiving decryption keys associated with the bitstream.

2. The apparatus of claim 1, wherein the bitstream is generated by encrypting original video frames using an encryption key, wherein the at least one transcoding operation does not reveal content of the original video frames to the apparatus.

3. The apparatus of claim 2, wherein the bitstream from the content distributor is decryptable using a decryption key corresponding to the encryption key, and wherein the decryption key comprises a different key than the at least one re-encryption key.

4. The apparatus of claim 3, wherein the encryption key is a permutation of k numbers, where k is an integer greater than one, wherein the permutation of k numbers is selectable from k! possibilities using a pseudorandom algorithm, and wherein each of the k numbers indicates a position of one of k transform blocks representing an associated original video frame.

5. The apparatus of claim 4, wherein the encryption key is denoted as K_enc[j] where [i] denotes a j-th number according to an order of the permutation of k numbers for j=1, ..., k, and wherein encrypting the associated original video frame comprises moving a j-th transform block in the original video frame to be a K_enc[j]-th transform block in the encrypted video frames.

6. The apparatus of claim 3, wherein the processor is further configured to encode the at least one re-encrypted representation prior to transmission to the user devices.

7. The apparatus of claim 1, wherein the transcoding operation comprises a resolution reduction, a bit rate reduction, a frame rate reduction, or combinations thereof.

8. A method comprising:
receiving a bitstream from a content distributor for storage in a content delivery network (CDN), wherein the bitstream comprises encrypted video frames;
receiving requests from a plurality of user devices for a plurality of representations of the bitstream;
performing at least one transcoding operation on the bitstream to generate at least one transcoded representation of the bitstream based on the requests from the user devices;
generating at least one re-encryption key for the requests from user devices;
re-encrypting the at least one transcoded representation with the at least one re-encryption key generated for the requests for the user devices to create at least one re-encrypted representation;
transmitting the at least one re-encrypted representation to at least one of the user devices responsive to the requests; and
transmitting the at least one re-encryption key to the content distributor to support generation and distribution of at least one updated decryption key to the at least one of the user devices for decryption of the at least one re-encrypted representation without receiving decryption keys associated with the bitstream.

9. The method of claim 8, wherein the bitstream from the content distributor is decryptable using a decryption key corresponding to an encryption key employed to encrypt the bitstream video frames.

10. The method of claim 9, wherein the encryption key is a permutation of k numbers, where k is an integer greater than one, and wherein each of the k numbers indicates a position of one of k transform blocks in an original video frame associated with the encrypted video frames.

11. The method of claim 10, wherein the encryption key is denoted as K_enc[j] where [i] denotes a j-th number according to an order of the permutation of k numbers for j=1, ..., k, and wherein encrypting the associated original video frame comprises moving a j-th transform block in the original video frame to be a K_enc[j]-th transform block in the encrypted video frames.

12. The method of claim 8, further comprising:
encoding the at least one re-encrypted representation prior to transmission to the user devices.

13. The method of claim 8, wherein the transcoding operation comprises a resolution reduction, a bit rate reduction, a frame rate reduction, or combinations thereof.

* * * * *

UNITED STATES PATENT AND TRADEMARK OFFICE
CERTIFICATE OF CORRECTION

PATENT NO. : 8,989,377 B2  
APPLICATION NO. : 13/732240  
DATED : March 24, 2015  
INVENTOR(S) : Xin Wang et al.

Page 1 of 1

It is certified that error appears in the above-identified patent and that said Letters Patent is hereby corrected as shown below:

In the claims:

Column 17, Lines 12-18, Claim 5, should read as:
-- 5. The apparatus of claim 4, wherein the encryption key is denoted as K_enc[j] where [j] denotes a j-th number according to an order of the permutation of k numbers for j=1, ..., k, and wherein encrypting the associated original video frame comprises moving a j-th transform block in the original video frame to be a K_enc[j]-th transform block in the encrypted video frames. --

Column 18, Lines 23-29, Claim 11, should read as:
-- 11. The method of claim 10, wherein the encryption key is denoted as K_enc[j] where [j] denotes a j-th number according to an order of the permutation of k numbers for j=1, ..., k, and wherein encrypting the associated original video frame comprises moving a j-th transform block in the original video frame to be a K_enc[j]-th transform block in the encrypted video frames. --

Signed and Sealed this  
Twentieth Day of October, 2015

Michelle K. Lee  
*Director of the United States Patent and Trademark Office*